United States Patent
Maruoka

(10) Patent No.: US 7,712,501 B2
(45) Date of Patent: May 11, 2010

(54) HEAVY DUTY TIRE

(75) Inventor: Kiyohito Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 594 days.

(21) Appl. No.: 11/183,942

(22) Filed: Jul. 19, 2005

(65) Prior Publication Data

US 2006/0027300 A1 Feb. 9, 2006

(30) Foreign Application Priority Data

Aug. 6, 2004 (JP) .............................. 2004-231236

(51) Int. Cl.
- B60C 9/18 (2006.01)
- B60C 15/00 (2006.01)
- B60C 15/04 (2006.01)
- B60C 15/06 (2006.01)

(52) U.S. Cl. ....................... 152/534; 152/526; 152/540; 152/552

(58) Field of Classification Search ................. 152/526, 152/527, 534, 552, 540
See application file for complete search history.

(56) References Cited

U.S. PATENT DOCUMENTS

| 4,310,043 A | * | 1/1982 | Inoue | 152/527 |
| 5,660,654 A | * | 8/1997 | Miyazaki | 152/534 |
| 5,772,811 A | * | 6/1998 | Ueyoko et al. | 152/540 |
| 7,152,647 B2 | * | 12/2006 | Maruoka et al. | 152/552 |
| 2005/0150583 A1 | * | 7/2005 | Maruoka et al. | 152/552 |

FOREIGN PATENT DOCUMENTS

| BE | 751567 A | * | 3/1978 |
| EP | 1 388 435 A1 | * | 2/2004 |
| EP | 1 479 537 A2 | * | 11/2004 |
| JP | 11321248 A | * | 11/1999 |

* cited by examiner

Primary Examiner—Adrienne C Johnstone
(74) Attorney, Agent, or Firm—Birch, Stewart, Kolasch & Birch, LLP

(57) ABSTRACT

A heavy duty tire comprises a single carcass ply and a tread reinforcing belt. Each carcass ply turnup portion comprises a base part under a bead core and a radially outer part extending axially inwardly towards the carcass ply main portion. The belt consists of three plies of cords, wherein the cords of the radially outer ply are inclined toward one direction at an angle of from 13 to 23 degrees with respect the fire equator; the cords of the intermediate ply are inclined at an angle of from 13 to 23 degrees toward one direction being opposite to that of the radially outer ply; and the cords of the radially inner ply are arranged at an angle of from 30 to 70 degrees toward one direction being opposite to that of the radially outer belt ply.

5 Claims, 4 Drawing Sheets

HEAVY DUTY TIRE

FIELD OF THE INVENTION

The present invention relates to a pneumatic tire, more particularly to a heavy duty tire having a specific combination of a bead structure and a tread reinforcing belt.

DESCRIPTION OF RELATED ART

In heavy duty tires used in severe service conditions under heavy load and high inflation pressure, its bead portion is conventionally formed as being stiff and thick by turning the carcass ply (a) up to a high position (ha) along the axially outer surface of the bead apex rubber (c) and disposing rubber layers along the turnup portion (a1) as shown in FIG. 4. Accordingly, the weight of the bead portion is heavy and in consequence the tire weight becomes heavy.

In recent years, to reduced the weight of a heavy duty tire for the purpose of economizing fuel consumption and the like, a so-called slim bead structure has been proposed, wherein as shown in FIG. 5, a carcass ply (a) is wound almost once around a bead core (b), and the small wound portion (a1) is secured between a bead apex rubber (c) and the bead core (b), and the bead rubber volume is reduced. Such slim bead structures are disclosed in the unexamined Japanese patent publication Nos. 11-321244 and 2000-219016.

In this structure, the rigidity of the bead portion against lateral forces becomes small when compared with the conventional carcass ply turnup structure as shown in FIG. 4. Thus, this structure has a weak side such that the lateral spring constant and the cornering power become relatively small, and the tire tends to become inferior in the steering stability.

SUMMARY OF THE INVENTION

Therefore, in order to improve the steering stability of a tire having a slim bead structure, the present inventor studied and discovered that: by reducing the number of the tread reinforcing belt from four plies to three plies contrary to the common knowledge, and by specifically defining the cord angles, cord orientation directions and ply strengths of the belt plies, in case of the slim bead structure, contrary to expectations, it is possible to increase the lateral spring constant and cornering power of the tire to improve the steering stability while achieving a further weight reduction.

It is therefore, an object of the present invention to provide a heavy duty tire having a slim bead structure, in which the lateral spring constant and cornering power of the tire are increased to improve the steering stability, and it is also possible to further reduce the tire weight.

According to the present invention, a heavy duty tire includes:

a carcass ply extending between a pair of bead portions through a tread portion and a pair of sidewall portions and turned up around a bead core in each bead portion from the inside to the outside of the tire to form a pair of turnup portions and a main portion therebetween, each turnup portion comprising a base part under the bead core and a radially outer part extending axially inwardly towards the main portion; and a belt disposed radially outside the carcass in the tread portion, and consisting of three plies of cords, wherein the cords of the radially outer third ply are inclined toward one direction at an angle of from 13 to 23 degrees with respect the tire equator, the cords of the intermediate second ply are inclined at an angle of from 13 to 23 degrees with respect the tire equator toward one direction which is opposite to that of the radially outer third ply, the cords of the radially inner first ply are arranged at an angle of from 30 to 70 degrees with respect the tire equator toward one direction which is opposite to that of the radially outer third belt ply, and the total of strengths S1, S2 and S3 of the first belt ply, second belt ply and third belt ply, respectively, is in a range of from 120 to 170 kN, wherein the strength of each ply is the total of the forces at break of the cords included within 5 cm width of the ply in the perpendicular direction to the cord direction.

In this specification, unless otherwise noted, dimensions of the tire are measured in a state that the tire is mounted on a wheel rim and inflated to 50 kPa but loaded with no tire load (hereinafter the "measuring state").

Here, the wheel rim is a wheel rim officially approved for the tire by a standard organization, for example, JATMA (Japan and Asia), T&RA (North America), ETRTO (Europe), STRO (Scandinavia) and the like.

BRIEF DESCRIPTION OF THE DRAWINGS

An embodiment of the present invention will now be described in detail in conjunction with the accompanying drawings.

Detailed description of the invention

Figure 1:
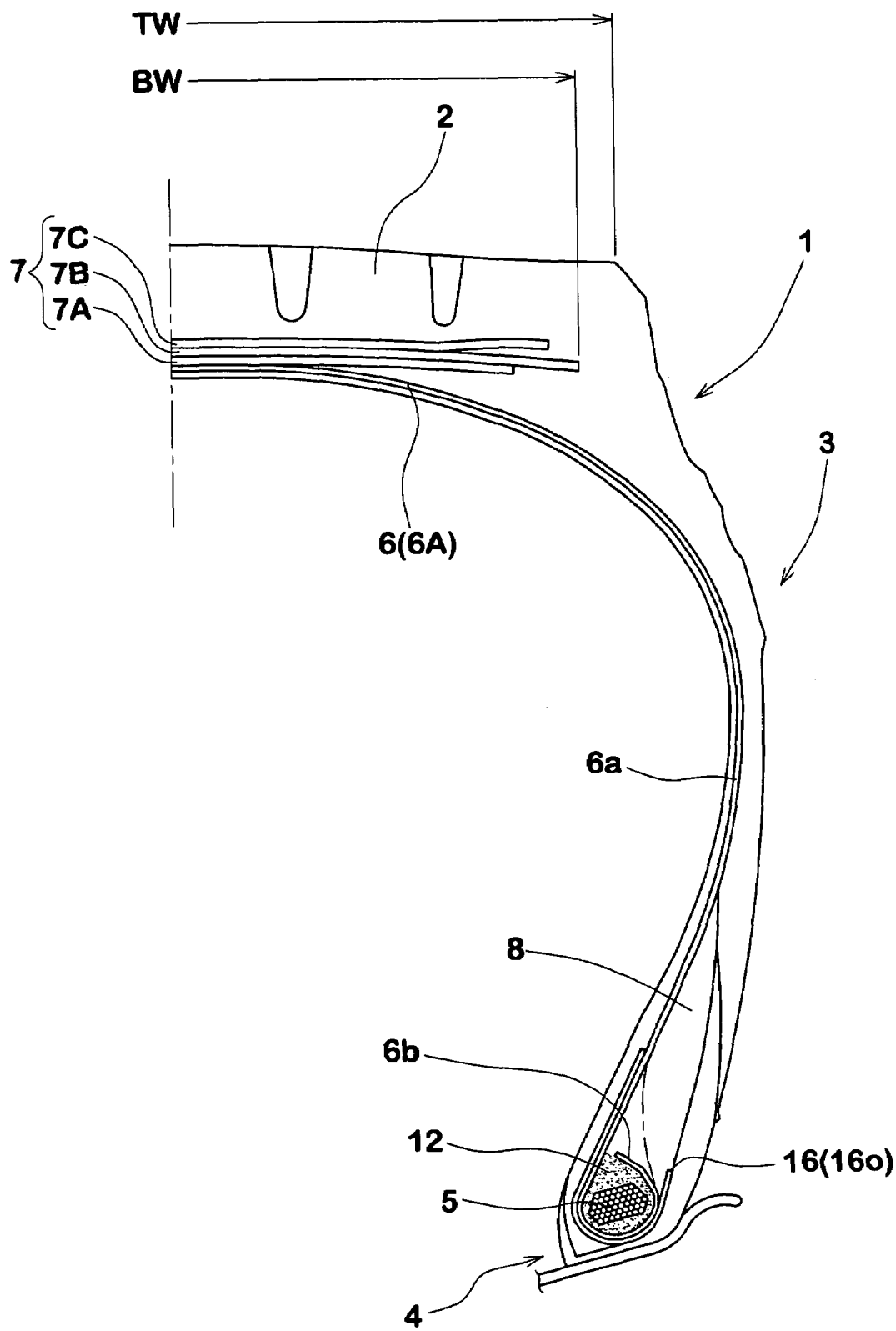
FIG. 1 is a cross sectional view of a heavy duty tire according to the present invention.

In the drawings, heavy duty tire 1 according to the present invention comprises a tread portion 2, a pair of sidewall portions 3, a pair of axially spaced bead portions 4 each with a bead core 5 therein, a carcass 6 extending between the bead portions 4, and a belt 7 disposed radially outside the carcass in the tread portion.

FIG. 1 shows the tire in the above-mentioned measuring state. The tire in this example is a tubeless tire to be mounted on a standard rim J which is a center-drop 15-degree-taper rim. The bottom of the bead portion 3 is accordingly inclined at 15 degrees or a slightly larger angle with respect to the tire axial direction.

The above-mentioned bead core 5 is an inextensible ring formed by winding a steel wire in an orderly fashion. In other words, a bead wire is wound into a specific cross sectional shape. The cross-sectional shape is in this embodiment a flattened hexagon being longer in a direction which is substantially parallel to the bottom of the bead portion. More specifically, the bead core 5 has a radially inner side SL and a radially outer side Su which are substantially parallel to the bead seat J1 of the wheel rim J. In this embodiment, thus the sides SL and Su are inclined at substantially 15 degrees with respect to the tire axial direction because the bead seat J1 is inclined 15 degrees. As to the cross-sectional shape, aside from the flattened hexagon, another shape such as equilateral hexagons and rectangles longer in the above-mentioned direction, etc can be used. Incidentally, The bead core 5 may be wrapped with a rubber sheet or tape or a textile to prevent loose.

The carcass 6 comprises a single ply 6A of steel cords arranged radially at an angle of 90 to 70 degrees with respect to the tire equator co, and extending between the bead portions 4 through the tread portion 2 and sidewall portions 3, and turned up around the bead core 5 in each bead portion 4 from the inside to the outside of the tire so as to form a pair of turnup portions 6b and one main portion 6a therebetween extending one of the bead cores 5 to the other.

Each edge portion of the carcass ply 6A is wound almost once around the bead core 5 so that the turnup portions 6b terminates before the main portion 6a, while leaving a positive gap Lb between the edge Ma thereof and the main portion 6a. The edge of the turnup portion is secured between the bead apex rubber 8 and the bead core 5. Thus, according to the present invention, the conventional carcass turned-up portions extending radially outwardly along the axially outside of the bead apex are not provided.

In this embodiment, the turnup portion 6b comprises an arc-shaped base part 10 and a radially outer part 11.

The arc-shaped base part 10 extends along an axially inner side Si, the radially inner side SL and an axially outer side so of the bead core 5.

The radially outer part 11 may be extended from the base part 10 while contacting with the radially outer side Su of the bead core 5. In this embodiment, however, the radially outer part 11 extends from the base part 10 while separating from the radially outer side SU of the bead core 5.

Here, the radially outer part 11 is defined as a part on the radially outside of a straight line K which is defined as extending on the radially outer side Su. In the case that the cross sectional shape is not the above-mentioned flattened hexagon, the straight line K is defined as a tangential line to the bead core which is inclined at the same angle as the bottom of the bead portion or the bead seat of the wheel rim, namely, 15 degrees in this example.

The radially outer part 11 is inclined towards the carcass ply main portion 6a at an angle theta of less than 90 degrees, preferably less than 75 degrees with respect to the radially outer side SU or the line K. The radially outer part 11 may be straight in the tire cross section, but in this embodiment, the radially outer part 11 is slightly bent radially inwardly at a position toward the radially inner end Mb thereof. Further, it is also possible that the radially outer part 11 is slightly curved radially inwards with a single radius arc or the like.

In any case, the radially outer end Ma of the radially outer part 11 is spaced apart from the line K by a distance La of not less than 3 mm, preferably more than 4 mm when measured perpendicularly to the line K. Therefor, even if the cords are made of a material showing a strong springback, defects such as void and separation resulting from the springback of the radially outer part 11 can be prevented. If the distance La becomes too large, as the outer end Ma reaches to a large strain area and damages become liable to occur at the outer end Ma. Therefore, the distance La is preferably not more than 12 mm, more preferably less than 10 mm.

Further, it is also desirable that the minimum distance Lb between the outer end Ma and the main portion 6a is more than 1 mm, preferably more than 2 mm, more preferably more than 3 mm because, if the distance Lb is less than 1 mm, there is a high possibility that, at the time of a large tire deflection, the outer end Ma comes into contact with the main portion 6a and a fretting wear occurs. If the distance Lb is more than 10 mm, as the radially outer part 11 becomes short correspondingly, it is difficult to secure the turnup portion 6b to the bead core. Therefore, the distance Lb is not more than 10 mm, preferably less than 6 mm, more preferably less than 5 mm, still more preferably less than 4 mm.

Between the bead core 5 and the turnup portion 6b, a bead filler 12 made of a soft rubber is disposed. In this embodiment, as the radially outer part 11 separates from the bead core 5, the bead filler 12 has a major part 12A within a space surrounded by the bead core 5, the radially outer part 11 and the carcass ply main portion 6a, thus having a substantially triangular cross-sectional shape. Further, the bead filler 12 includes a relatively thin part 12B between the arc-shaped base part 10 and the bead core 5. In order that the bead filler 12 can mitigate stress concentration around the outer end Ma, the soft rubber of the bead filler 12 has a relatively low complex elastic modulus Ea* of not more than 25 Mpa, but more than 2 Mpa. Here, the complex elastic modulus is measured under the following conditions: a temperature of 70 degrees Celsius, a frequency of 10 Hz, and a dynamic distortion of plus/minus 2%.

In order that it becomes possible to increase the lateral spring constant and cornering power in cooperation with the above-mentioned bead structure and thereby to improve the steering stability, in spite of a heavy duty tire, the belt 7 is made up of three plies of belt cords, and on the basis of the three-ply structure, the cord angles, cord orientation directions and ply strength of the three belt plies are specifically defined.

As shown in FIG. 1, the belt 7 is made up of a first ply 7A, a second ply 7B and a third ply 7C which are disposed on top of another from the carcass 6 towards the radially outside in this order.

Figure 3:
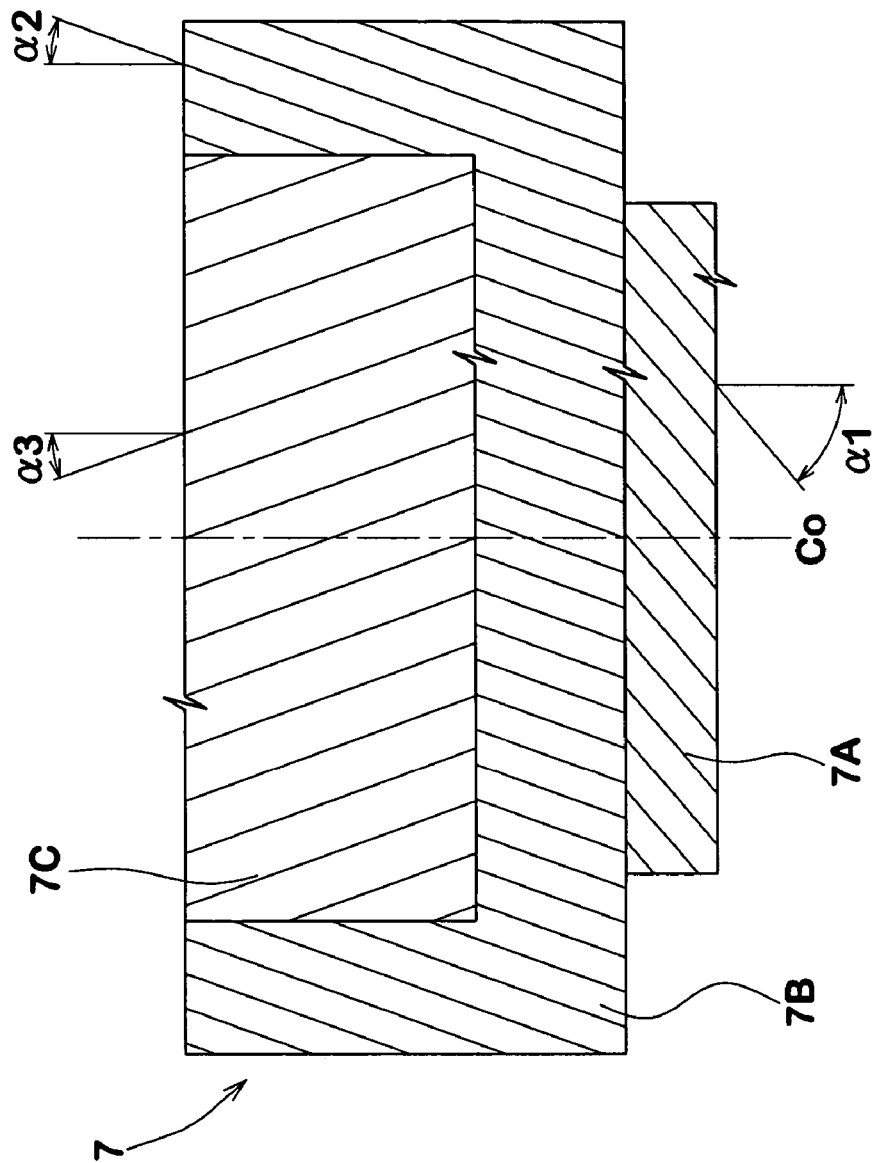
FIG. 3 is a schematic partial plan view of the belt showing cord arrangements.
Figure 5:
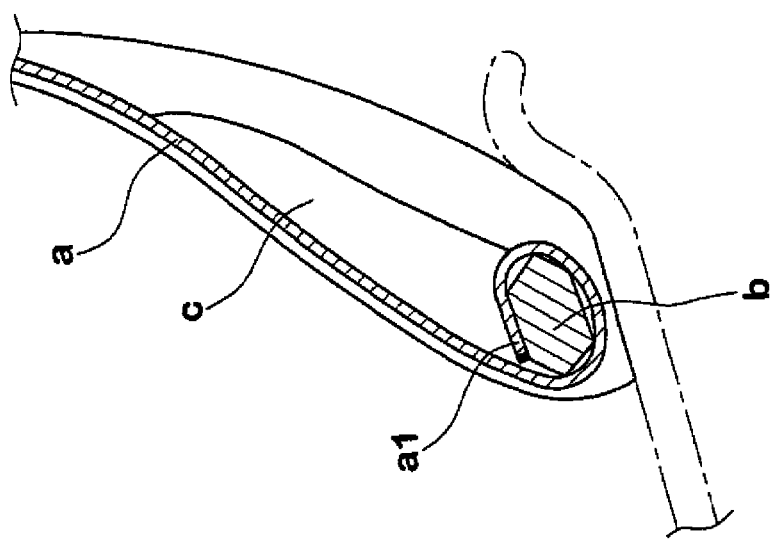
FIG. 5 is a cross sectional view showing a slim bead structure for a heavy duty tire.

As shown in FIG. 5, the belt cords of the outermost third belt ply 7C are inclined at an angle alpha3 of from 13 to 23 degrees with respect the tire equator Co toward one direction (Left side upward direction in FIG. 3), and the belt cords of the second belt ply 7B are inclined at an angle alpha2 of from 13 to 23 degrees with respect the tire equator Co toward one direction which is opposite to that of the third belt ply 7C (Right side upward direction), and the belt cords of the innermost first belt ply 7A are arranged at an angle alpha1 of from 30 to 70 degrees with respect the tire equator Co toward one direction which is opposite to that of the third belt ply 7C (Right side upward direction).

In this embodiment, all the belt cords are steel cords. The width Bw of the belt 7 which is the width of the widest ply is preferably 85 to 95% of the tread width Tw between the tread edges. In this example, the widest ply is the intermediate second ply 7B, and the innermost first ply 7A is narrowest, and the widths of these plies 7B and 7A are also in the range of 85 to 95% of the tread width Tw.

In order to improve the steering stability, it is important that the total ΣS of the strengths S1, S2 and S3 of the first, second and third belt plies 7A, 7B and 7C (hereinafter generically the "strength S") is set in a range of not less than 120 kN, preferably more than 130 kN, but not more than 170 kN, preferably less than 160 kN, more preferably less than 150 kN.

Here, the strength S of a belt ply is the total of the forces at break of the cords included within 5 cm width of the ply in the perpendicular direction to the cord direction. Therefore, when all the cords in a ply are identical, the strength S can be obtained by multiplying the force at break E of a cord and the cord count N (/5 cm). Namely, S=E×N, S1=E1×N1, S2=E2×N2, S3=E3×N3.

The force at break E(E1,E2,E3) is measured according to the tensile test described in the Japanese Industrial standard JIS-G3510 "Testing methods for steel tire cords", Paragraph 6.4 "Force at break and Elongation at break".

The above-mentioned value 120 kN of the lower limit for the total ΣS of the ply strengths S1, S2 and S3 is larger than the total of the ply strengths of the first to third belt plies of the conventional four-ply structure for the heavy duty tires. Thus, the belt structure in this invention is not the same as the first to third belt plies in the conventional four-ply structure. If the total ΣS is less than 120 kN, the belt rigidity and hoop effect become insufficient, and it is difficult to obtain the required lateral spring constant and cornering power. If the total ΣS is more than 170 kN, a significant increase of the belt weight is inevitable which will nullify the weight reduction owing to the slim bead structure and three-ply belt structure. Therefore, by setting the total within the above-mentioned range, the lateral spring constant and cornering power can be increased while achieving a significant weight reduction.

In the conventional four-ply belt structure, if the belt plies are decrease to three plies, the belt cords become liable to be cut when the tire treads a pointed object such as stone. Therefore, not to decrease the cut resistance, or if at all possible, to improve the cut resistance, the inventor made study and at the same time made research of a valuation method for the cut resistance because the widely used method which is described in the Japanese Industrial standard JIS-D4230 "Automobile tires", Paragraph 6.1 "Tire strength (breaking energy) test" can not reflect the actuality of the cord cut or damages.

As a result of research, it was discovered that when the tire is inflated to a very high pressure of 1200 kPa (about 150% or more of the maximum pressure) and a weight whose tip end is hemispheric of a radius 19 mm free falls to the tread portion, the resultant cord cuts and damages reflect the cord cuts occurring under the actual service conditions with tolerable correctness. Thus, using this method and various test tires, experiments were carried out, and as a result, the following fact was discovered.

In the three-ply belt structure in which the three plies have same strength, the cord cut starts to occur from a second belt ply 7B, then a third belt ply 7C and lastly a first belt ply 7A. Thus by providing different strengths, the cut resistance can be improved.

In the present invention, therefore, the strengths S1, S2 and S3 of the first belt ply 7A, second belt ply 7B and third belt ply 7C, respectively, are provided to meet at least the following conditions (1) and (2):

$$S2 \geq S3 \geq S1 \quad (1)$$

$$S2 > S1 \quad (2)$$

Further, it was discovered from the results of further study that the maximum effect can be obtained with a minimum material by satisfying the following conditions (3) and (4) and preferably a further condition (5).

$$2.1 \geq S2/S1 \geq 1.7 \quad (3)$$

$$1.5 \geq S2/S3 \geq 1.2 \quad (4)$$

$$64 kN \geq S2 \geq 52 kN \quad (5)$$

Thus, the cut resistance is effectively improved, and a favorable result could be obtained such that the impulsive breaking energy becomes more than 1000 Joules, which is larger than that in the conventional four-ply belt structure.

Figure 2A:
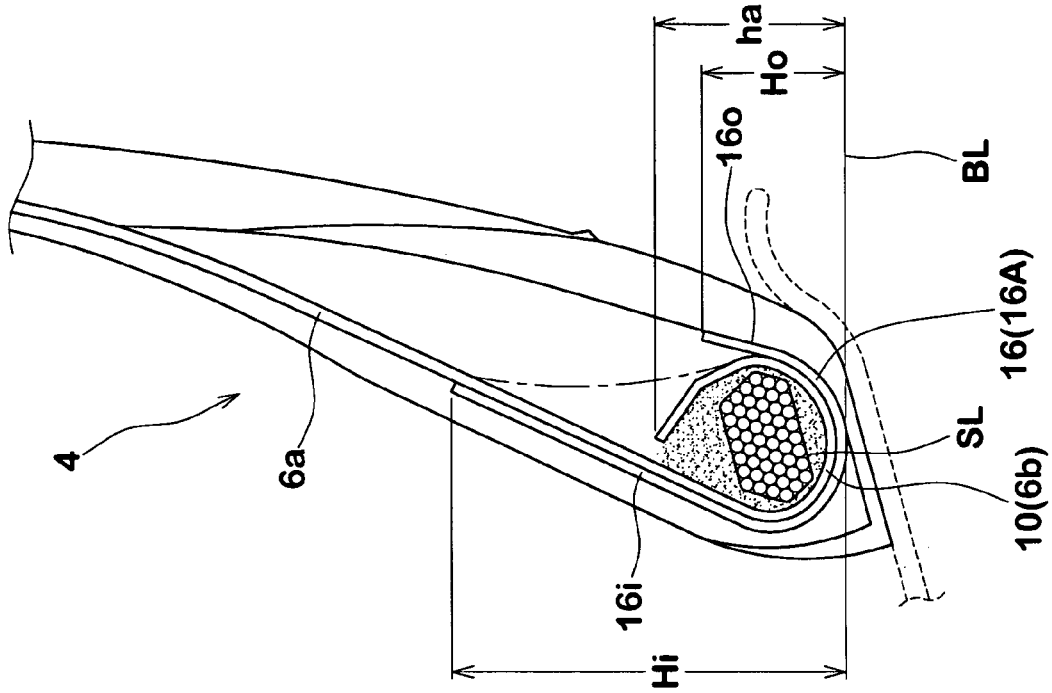
FIGS. 2a and 2b are cross sectional views of the bead portion.
Figure 2B:
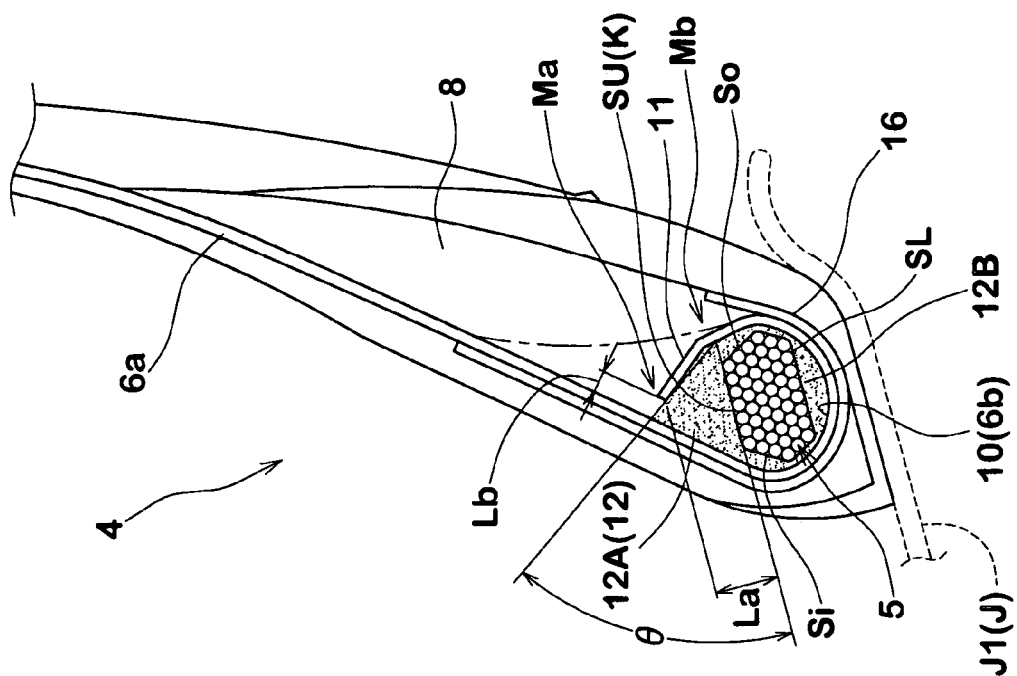

In this embodiment, further, in order to improve the durability of the bead portion 4, a bead reinforcing layer 16 is provided as shown in FIG. 2b.

The bead reinforcing layer 16 is a single ply of steel cords arranged at an angle of from 10 to 40 degrees with respect to the tire circumferential direction. The bead reinforcing layer 16 comprises: an arc-shaped base part 16A disposed on the radially inside of the arc-shaped base part 10 of the carcass ply; and an axially outer part 16o extending radially outwards, separating from the arc-shaped base part 10 and inclining axially outwards; and optionally an axially inner part 16i extending along the axially inner surface of the carcass ply main portion 6a.

In the case of a slim bead structure, the deformation of the sidewall portion when loaded is relatively large. Therefore, not to concentrate the compressive strain, the radially outer end of the axially outer part 16o is positioned in the bead portion 4. Specifically, the radial height Ho thereof is set in the range of from 5 to 20 mm from the bead base line BL. Further, the radial height Ho is preferably lower than the radial height ha of the outer end Ma of the radially outer part 11.

On the other hand, as the axially inner part 16i is disposed adjacently to the carcass ply main portion 6a, the radially outer end may be located at a relatively higher position so that the bead portion is effectively reinforced. But, in view of the ride comfort and weight reduction, it is preferable that the radial height Hi of the axially inner part 16i is in a range of not more than 70 mm, more preferably less than 50 mm, but, in this example, more than the height Ho and also more than the height ha, each from the bead base line BL. Here, the bead base line BL is an axial line drawn passing a position corresponding to the wheel rim diameter.

Comparison Tests

Test tires, heavy duty radial tires of size 11R22.5 (rim size 7.50×22.5) having the structure shown in FIG. 1 and specifications shown in Table 1 were manufactured and tested for the cornering power, lateral spring constant, steering stability, bead durability, and tire strength. All the tires had the same specifications excepting those shown in Table 1.

(1) Cornering power test: The cornering power was measured under the following conditions:
   Slip angle: 1 degree
   Speed: 4 meter/hr
   Vertical tire load: 26.72 kN
   Tire inflation pressure: 800 kPa
(2) Lateral spring constant test: Applying a lateral force to the tire, the lateral deflection of the tire was measured under the following conditions, and the lateral spring constant was obtained as the ratio of the lateral force(load)/lateral deflection.
   Lateral force (load): 2 kN
   Vertical tire load: 26.72 kN
   Tire inflation pressure: 800 kPa
(3) Steering stability test: A 2-2-D truck (load capacity 22 tons) provided on the ten wheels with test tires was run on a dry asphalt-paved road in a tire test course. (Tire inflation pressure 800 kPa)

The steering stability was evaluated by the test driver based on the cornering characteristics and convergence. The results are indicated in Table 1 using an index based on Conventional tire being 100, wherein the larger the index number, the better the steering stability.
(4) Bead durability test: Using a drum tester, the total running time until any bead damage was caused was measured under the following conditions:
   Vertical tire load: 26.72 kN x3=80.16 kN
   Running speed: 20 km/hr
   Tire inflation pressure: 800 kPa The results are indicated in Table 1 using an index based on conventional tire being 100, wherein the larger the index number, the higher the durability.

(5) Tire strength tests:

(5A) Plunger test: According to the Japanese Industrial Standard JIS-D4230 "Automobile tires", Paragraph 6.1 "Tire strength (breaking energy) test", the breaking energy was measured by the use of a plunger testing machine. The measuring conditions were as follows:

Plunger diameter: 19 mm
Plunger speed: 50.0 plus/minus 2.5 mm/minute
Tire inflation pressure: 800 kPa (5B) Impact test: As described above, the tire was mounted on a standard wheel rim and inflated to a very high pressure, and by letting a weight free-fall from various heights so that the tip end thereof came into collision with the tread portion, and by increasing the height of the free-fall, when the tread portion was broken, the breaking energy was computed from the height of the free-fall and the mass of the weight.

Tire inflation pressure: 1200 kPa
Mass of weight: 200 kg
Shape of Tip end: Hemisphere of radius 19 mm The results are indicated in Table 1, wherein the larger the value, the larger the strength.

It was confirmed from the test results that the steering stability can be improved while achieving a further weight reduction and in particular by providing the ply strengths in specific relationships the tire strength can be effectively increased.

TABLE 1

Figure 4:
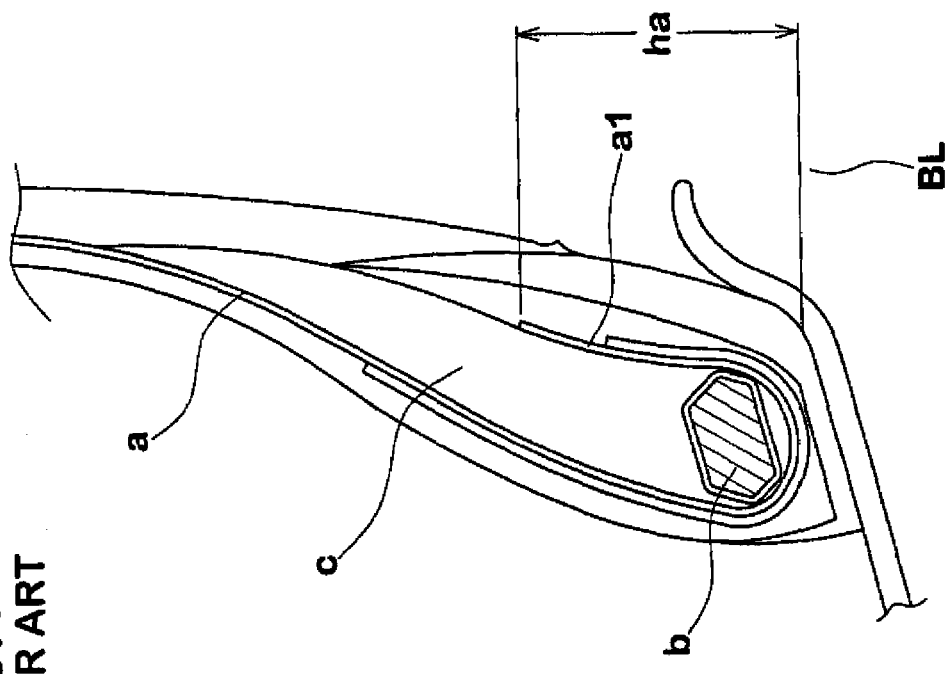
FIG. 4 is a cross sectional view showing a conventional bead structure for a heavy duty tire.

| Tire | Conventional | Ex. 1 | Ex. 2 | Ex. 3 | Ex. 4 | Ref. 1 | Ref. 2 | Ref. 3 | Ref. 4 |
|---|---|---|---|---|---|---|---|---|---|
| Bead structure | FIG. 4 | FIG. 2 | FIG. 2 | FIG. 2 | FIG. 2 | FIG. 2 | FIG. 2 | FIG. 2 | FIG. 2 |
| Turned up portion | | | | | | | | | |
| Distance La (mm) | — | 2 | 2 | 2 | 2 | 2 | 2 | 2 | 2 |
| Distance Lb (mm) | — | 7 | 7 | 7 | 7 | 7 | 7 | 7 | 7 |
| Height ha (mm) | 55 | 27 | 50 | 27 | 27 | 27 | 27 | 27 | 27 |
| Belt layer | | | | | | | | | |
| First ply | | | | | | | | | |
| Inclining direction | R | R | R | R | R | R | R | R | R |
| Cord angle alpha1 (deg.) | 50 | 50 | 50 | 50 | 50 | 20 | 20 | 50 | 50 |
| Ply strength S1 (kN) | 31 | 31 | 31 | 31 | 31 | 61 | 61 | 31 | 31 |
| Second ply | | | | | | | | | |
| Inclining direction | R | R | R | R | R | L | L | R | R |
| Cord angle alpha2 (deg.) | 20 | 20 | 20 | 20 | 20 | 20 | 20 | 20 | 20 |
| Ply strength S2 (kN) | 43 | 56 | 56 | 61 | 56 | 61 | 61 | 61 | 43 |
| Third ply | | | | | | | | | |
| Inclining direction | L | L | L | L | L | L | L | L | L |
| Cord angle alpha3 (deg.) | 20 | 20 | 20 | 20 | 20 | 20 | 20 | 20 | 20 |
| Ply strength S3 (kN) | 43 | 56 | 56 | 43 | 43 | 56 | 43 | 61 | 43 |
| Fourth ply | | | | | | | | | |
| Inclining direction | L | — | — | — | — | — | — | — | — |
| Cord angle alpha4 (deg.) | 20 | — | — | — | — | — | — | — | — |
| Ply strength S4 (kN) | 43 | — | — | — | — | — | — | — | — |
| Total ΣS | 160 | 143 | 143 | 135 | 130 | 178 | 165 | 153 | 117 |
| S2/S1 | 1.4 | 1.8 | 1.8 | 2 | 1.8 | 1 | 1 | 2 | 1.4 |
| S2/S3 | 1 | 1 | 1 | 1.4 | 1.3 | 1.1 | 1.4 | 1 | 1 |
| Belt weight (Kg) | 7.58 | 7.4 | 7.4 | 7.18 | 7 | 8.3 | 8.1 | 7.81 | 6.48 |
| Cornering power (N) | 2750 | 2850 | 2830 | 2850 | 2830 | 2580 | 2580 | 2820 | 2650 |
| Lateral spring constant (N/mm) | 320 | 335 | 341 | 335 | 330 | 310 | 310 | 340 | 312 |
| Steering stability | | | | | | | | | |
| Cornering | 100 | 110 | 110 | 110 | 110 | 90 | 90 | 110 | 95 |
| Convergence | 100 | 105 | 110 | 105 | 110 | 90 | 90 | 110 | 95 |
| Bead durability | 100 | 110 | 103 | 110 | 110 | 110 | 110 | 110 | 110 |
| Tire strength | | | | | | | | | |
| Plunger test (J) | 3010 | 3960 | 3950 | 3900 | 3850 | 4050 | 4010 | 3950 | 2810 |
| Impact test (J) | 900 | 1010 | 1010 | 1070 | 1050 | 1170 | 1120 | 1080 | 850 |

The invention claimed is:

1. A heavy duty tire comprising:
a carcass composed of a single ply of steel cords extending between a pair of bead portions through a tread portion and a pair of sidewall portions and turned up around a bead core in each said bead portion from the inside to the outside of the tire to form a pair of carcass ply turnup portions and a carcass ply main portion therebetween,
wherein each said turnup portion comprises a base part under the bead core and a radially outer part extending axially inwardly towards the main portion,
wherein the radially outer part is defined as a part on the radially outside of a tangential line (K) to the radially outer side of the bead core inclined at the same angle as a bottom of the bead portion, and the radially outer part is inclined towards the carcass ply main portion at an angle (theta) of less than 90 degrees with respect to the tangential line K;

wherein the bead portions are each provided with a bead reinforcing layer composed of a single ply of steel cords arranged at an angle of from 10 to 40 degrees with respect to the tire circumferential direction, the bead reinforcing layer comprises
- an arc-shaped base part disposed on the radially inside of an arc-shaped base part of the carcass ply,
- an axially outer part extending radially outwardly, separating from said arc-shaped base part of the carcass ply, and
- an axially inner part extending along the axially inner surface of the carcass ply main portion, wherein the radial height ha of the radially outer end (Ma) of said radially outer part of the carcass ply turnup portion is less than the radial height Hi of the axially inner part of the bead reinforcing layer and more than the radial height Ho of the radially outer end of the axially outer part of the bead reinforcing layer, the radial height Hi is not more than 70 mm, and the radial height Ho is in a range of from 5 to 20 mm, each height measured from the bead base line, a belt disposed radially outside the carcass in the tread portion, and consisting of three plies of cords, namely, a radially inner first ply, an intermediate second ply and a radially outer third ply, wherein the cords of the radially outer third ply are inclined toward one direction at an angle of from 13 to 23 degrees with respect the tire equator, the cords of the intermediate second ply are inclined at an angle of from 13 to 23 degrees with respect the tire equator toward one direction which is opposite to that of the radially outer third ply, the cords of the radially inner first ply are arranged at an angle of from 30 to 70 degrees with respect the tire equator toward one direction which is opposite to that of the radially outer third belt ply; and the total of strengths S1, S2 and S3 of the first belt ply, second belt ply and third belt ply, respectively, is in a range of from 120 to 170 kN, wherein the strength of each ply is the total of the forces at break of the cords included within 5 cm width of the ply in the perpendicular direction to the cord direction, and further the strengths S1, S2 and S3 satisfy the following conditions (1) and (2):

$$S2 \geq S3 \geq S1 \text{ and} \tag{1}$$

$$S2 > S1, \text{ and furthermore} \tag{2}$$

the strength S2 satisfies the following condition (5):

$$64 \text{ kN} \geq S2 \geq 52 \text{ kN}. \tag{5}$$

2. The heavy duty tire according to claim 1, wherein the strengths S1, S2 and S3 satisfy the following conditions (3) and (4):

$$2.1 \geq S2/S1 \geq 1.7 \text{ and} \tag{3}$$

$$1.5 \geq S2/S3 \geq 1.2. \tag{4}$$

3. The heavy duty tire according to claim 1, wherein the radially outer part extending towards the main portion terminates before the main portion, and the distance between the end thereof and the main portion is more than 1 mm.

4. The heavy duty tire according to claim 1, wherein the radially outer part extending towards the main portion terminates before the main portion, and the distance between the end thereof and bead core is not more than 12 mm.

5. The heavy duty tire according to claim 1, wherein the steel cords of the carcass ply are arranged radially at an angle of 90 to 70 degrees with respect to the tire equator, and each edge portion of the carcass ply is wound almost once around the bead core so that the radially outer part extending towards the main portion terminates before the main portion, and the distance between the end thereof and the main portion is more than 1 mm and the distance between the end thereof and bead core is not more than 12 mm.

* * * * *